US009524425B2

(12) United States Patent
Yamashita

(10) Patent No.: US 9,524,425 B2
(45) Date of Patent: Dec. 20, 2016

(54) GESTURE RECOGNITION DEVICE, GESTURE RECOGNITION METHOD, ELECTRONIC APPARATUS, CONTROL PROGRAM, AND RECORDING MEDIUM

(71) Applicant: OMRON Corporation, Kyoto-shi, Kyoto (JP)

(72) Inventor: Takayoshi Yamashita, Kyoto (JP)

(73) Assignee: OMRON Corporation, Kyoto (JP)

( * ) Notice: Subject to any disclaimer, the term of this patent is extended or adjusted under 35 U.S.C. 154(b) by 160 days.

(21) Appl. No.: 14/228,134

(22) Filed: Mar. 27, 2014

(65) Prior Publication Data

US 2014/0307919 A1     Oct. 16, 2014

(30) Foreign Application Priority Data

Apr. 15, 2013  (JP) ................................ 2013-085265

(51) Int. Cl.
  *G06K 9/00*    (2006.01)
  *G06F 3/01*    (2006.01)
  *G06K 9/32*    (2006.01)

(52) U.S. Cl.
  CPC ........... *G06K 9/00355* (2013.01); *G06F 3/017* (2013.01); *G06K 9/00389* (2013.01); *G06K 9/3241* (2013.01)

(58) Field of Classification Search
  CPC . G06F 3/017; G06K 9/00355; G06K 9/00389; G06K 9/3241
  USPC ................................................ 382/103, 126
  See application file for complete search history.

(56) References Cited

U.S. PATENT DOCUMENTS

| 2008/0181459 A1* | 7/2008 | Martin ............... G06K 9/00355 382/103 |
| 2011/0129124 A1* | 6/2011 | Givon ..................... G06F 3/011 382/107 |
| 2012/0062736 A1 | 3/2012 | Xiong |
| 2013/0004016 A1* | 1/2013 | Karakotsios ....... G06K 9/00355 382/103 |

FOREIGN PATENT DOCUMENTS

| JP | H08-279044 A | 10/1996 |
| JP | 2012-059271 A | 3/2012 |
| KR | 10-2008-0029730 A | 4/2008 |
| WO | 2007/097548 A1 | 8/2007 |

OTHER PUBLICATIONS

Extended European Search Report issued in corresponding European Application No. 14158100.9, mailed on Dec. 23, 2014 (8 pages).

(Continued)

*Primary Examiner* — Tom Y Lu
(74) *Attorney, Agent, or Firm* — Osha Liang LLP

(57) ABSTRACT

A gesture recognition device configured to recognize a gesture of a hand from a captured image of a user, having a fingertip candidate detector that detects a fingertip candidate from the image, a finger detector that detects a skin area as a finger, the skin area extending by a predetermined length in a certain direction from the fingertip candidate detected by the fingertip candidate detector, and a gesture type specifying unit that specifies a type of the gesture based on the number of fingers detected by the finger detector.

18 Claims, 6 Drawing Sheets

(56) References Cited

OTHER PUBLICATIONS

Kim, Jong-Min; et al.; "Hand Shape Recognition Using Fingertips"; Fuzzy Systems and Knowledge Discovery, 2008; Oct. 18, 2008; pp. 44-48 (5 pages).
Wang, Xiying; et al.; "Tracking of deformable human hand in real time as continuous input for gesture-based interaction"; Proceedings of the 12th International Conference on Intelligent User Interfaces; New York, New York; Jan. 1, 2007; pp. 235-242 (8 pages).
Schlattman, Markus; et al.; "Markerless 4 gestures 6 DOF real-time visual tracking of the human hand with automatic initialization"; Computer Graphics Forum; Wiley-Blackwell Publishing Ltd.; Oct. 12, 2007; vol. 26, No. 3, p. 467 (10 pages).
Notification of Preliminary Rejection issued in corresponding Korean Application No. 10-2014-0032622, mailed on Feb. 23, 2015 (17 pages).

* cited by examiner

GESTURE RECOGNITION DEVICE, GESTURE RECOGNITION METHOD, ELECTRONIC APPARATUS, CONTROL PROGRAM, AND RECORDING MEDIUM

BACKGROUND

1. Field

The present invention relates to a gesture recognition device that recognizes a gesture from a motion of a user, a gesture recognition method, an electronic apparatus, a control program, and a recording medium.

2. Related Art

Nowadays there is an electronic apparatus, such as a television receiver, a personal computer, and a tablet computer, in which a gesture recognition device that recognizes the gesture of a user's hand finger is incorporated. The electronic apparatus has an advantage that the user moves the hand finger to enable an intuitive operation, and various technologies for gesture recognition have been developed.

For example, in the technology disclosed in Japanese Unexamined Patent Publication No. 2012-59271, an apex of a convex hull of an outer shape, a hand area, and an arm area are detected to accurately specify an indication point of the user's finger. In the technology disclosed in Japanese Unexamined Patent Publication No. 8-279044, the gesture of the user is recognized by template matching.

In the gesture recognition device, it is necessary to accurately recognize various gesture in real time (through simple processing). However, the conventional technologies are not enough to accurately recognize various gesture in real time. Specifically, the technology of Japanese Unexamined Patent Publication No. 2012-59271 specializes in recognizing a predetermined shape of the user's hand, and the technology lacks versatility because the technology is hardly applied to the gesture recognition for another shape. In the technology of Japanese Unexamined Patent Publication No. 8-279044, the number of patterns used in the matching increases in order to enhance the accuracy. In this case, a resource increases, and actually there is a restriction to the enhancement of the accuracy.

SUMMARY

A gesture recognition device according to one or more embodiments of the present invention accurately recognizes various gestures through simple processing, a gesture recognition method, an electronic apparatus, a control program, and a recording medium.

In accordance with one or more embodiments of the present invention, a gesture recognition device configured to recognize a gesture of a hand from a captured image of a user, the gesture recognition device includes: a fingertip candidate detector configured to detect a fingertip candidate from the image; a finger detector configured to detect a skin area as a finger, the skin area extending by a predetermined length in a certain direction from the fingertip candidate detected by the fingertip candidate detector; and a gesture type specifying unit configured to specify a type of the gesture based on the number of fingers detected by the finger detector.

In accordance with one or more embodiments of the present invention, a gesture recognition device configured to recognize a gesture of a hand from a captured image of a user, the gesture recognition device includes: a fingertip candidate detector configured to detect a fingertip candidate from the image; a finger detector configured to detect a skin area as a finger, the skin area extending by a predetermined length in a certain direction from the fingertip candidate detected by the fingertip candidate detector; and a finger position specifying unit configured to specify a fingertip position of the finger detected by the finger detector as a position indicated by the user.

In accordance with one or more embodiments of the present invention, a gesture recognition method for recognizing a gesture of a hand from a captured image of a user, the gesture recognition method includes the steps of: detecting a fingertip candidate from the image; detecting a skin area as a finger, the skin area extending by a predetermined length in a certain direction from the fingertip candidate detected in the fingertip candidate detecting step; and specifying a type of the gesture based on the number of fingers detected in the finger detecting step.

In accordance with one or more embodiments of the present invention, a gesture recognition method for recognizing a gesture of a hand from a captured image of a user, the gesture recognition method includes the steps of: detecting a fingertip candidate from the image; detecting a skin area as a finger, the skin area extending by a predetermined length in a certain direction from the fingertip candidate detected in the fingertip candidate detecting step; and specifying a fingertip position of the finger detected in the finger detecting step as a position indicated by the user.

Accordingly, various gestures can accurately be recognized through the simple processing.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Configuration of Gesture Recognition Device)

A gesture recognition device according to one or more embodiments of the present invention recognizes a gesture of a hand from a captured image of a user. The gesture recognition device is incorporated in electronic apparatuses such as a television receiver, a personal computer, a mobile phone, a smart phone, a tablet computer, a game machine, a digital camera, and a digital video camera. The gesture recognition device acts as an operation unit that is of an operation input interface for the user in the electronic apparatus.

The gesture recognized by the gesture recognition device of one or more embodiments of the present invention will be described with reference to FIGS. 2A-2F. FIGS. 2A-2F show views illustrating various gestures recognized by the gesture recognition device.

Figure 2A:
FIGS. 2A-2F are views illustrating types of gestures of a hand recognized by the gesture recognition device.
Figure 2B:
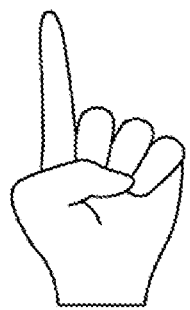
Figure 2C:
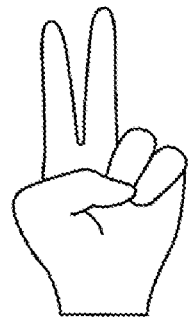
Figure 2D:
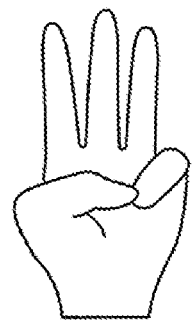
Figure 2E:
Figure 2F:
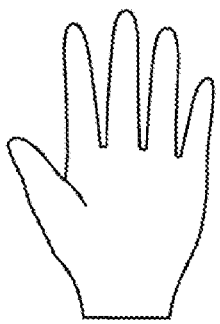

As illustrated in FIGS. 2A-2F, the gesture recognition device recognizes six types of gestures of the hand. Hereinafter, a shape of a hand in FIG. 2A is referred to as a "zero-finger shape", a shape of a hand in FIG. 2B is referred to as a "one-finger shape", a shape of a hand in FIG. 2C is referred to as a "two-finger shape", a shape of a hand in FIG. 2D is referred to as a "three-finger shape", a shape of a hand in FIG. 2E is referred to as a "four-finger shape", and a shape of a hand in FIG. 2F is referred to as a "five-finger shape".

For example, the gesture recognition device of one or more embodiments of the present invention does not distinguish the shape in FIG. 2C in which an index finger and a middle finger are raised and the shape in which the index finger and a little finger are raised, but recognizes as the "two-finger" shape. That is, the gesture recognition device according to one or more embodiments of the present invention recognizes shape of the hand based on the number of raised fingers. Alternatively, the gesture recognition device may recognize the shape of the hand based on the number of raised fingers and the type of the raised finger.

Figure 1:
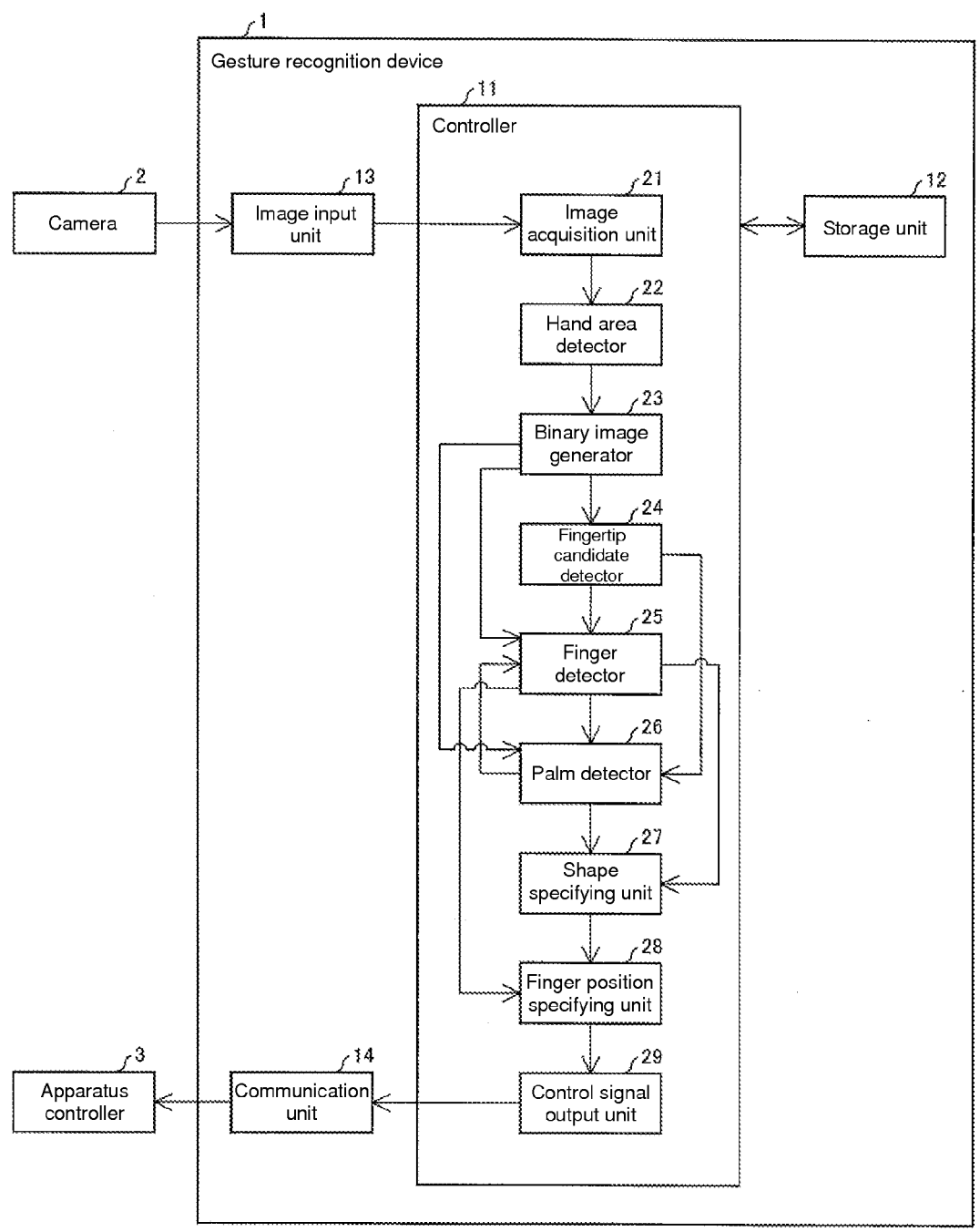
FIG. 1 is a block diagram illustrating a main part configuration of a gesture recognition device according to one or more embodiments of the present invention.

FIG. 1 is a block diagram illustrating an example of a main part configuration of a gesture recognition device 1. As illustrated in FIG. 1, gesture recognition device 1 includes a controller 11, a storage unit 12, an image input unit 13, and a communication unit 14.

The image input unit 13 is an interface between the gesture recognition device 1 and an external device (in an example of FIG. 1, a camera 2), and the image input unit 13 is used when the gesture recognition device 1 acquires an image from an outside.

The communication unit 14 conducts communication with another device in a wireless or wired manner, and exchanges data according to an instruction of the controller 11. In one or more embodiments of the present invention, as described above, the gesture recognition device 1 is incorporated in the electronic apparatus, and the communication unit 14 outputs a signal to an apparatus controller 3, which controls integrally the electronic apparatus, according to the instruction of the controller 11.

The controller 11 executes a program read from the storage unit 12 to a temporary storage unit (not illustrated), whereby the controller 11 controls integrally each unit included in the gesture recognition device 1 while performing various calculations.

The controller 11 includes an image acquisition unit 21, a hand area detector 22, a binary image generator 23, a fingertip candidate detector 24, a finger detector 25, a palm detector 26, a shape specifying unit (gesture type specifying unit) 27, a finger position specifying unit 28, and a control signal output unit 29 as functional blocks. A CPU (Central Processing Unit) reads the program stored in a storage device constructed with a ROM (Read Only Memory) to the temporary storage unit constructed with a RAM (Random Access Memory), thereby implementing each of the functional blocks (21 to 29) of the controller 11.

The image acquisition unit 21 acquires the user's image captured by the camera 2 through the image input unit 13. Hereinafter, the image acquired from the camera 2 by the image acquisition unit 21 is referred to as an input image. The image acquisition unit 21 outputs the acquired input image to the hand area detector 22. In the case that the image is stored in the storage unit 12, the image acquisition unit 21 may read the image from the storage unit 12.

The input image acquired by the image acquisition unit 21 may be a two-dimensional image or a three-dimensional image. That is, the input image may have depth information on each pixel in addition to each pixel value (picture element value).

The hand area detector 22 acquires the input image from the image acquisition unit 21, detects the user's hand from the acquired input image, and extracts a hand area including the detected hand from the input image. The hand area detector 22 outputs the extracted hand area image to the binary image generator 23.

The hand area detector 22 can detect the user's hand using any well-known technology. For example, the hand area detector 22 may specify a moving area based on a difference between a previously-stored background image and the input image, and extract the specified moving area as the hand area. The hand area detector 22 may acquire plural continuous input images and extract an area having a large accumulation of an inter-frame difference as the hand area. The hand area detector 22 may detect the hand using techniques, such as Boosting and SVM (Support Vector Machine), which are used in general face detection. In the case that the electronic apparatus issues the instruction to the user to perform the hand gesture at a predetermined lateral position of a user's face, the hand area detector 22 may detect the user's face, and extract the area at the predetermined position as the hand area based on the detected face. The hand area detector 22 may specify the hand area using the depth information.

The binary image generator 23 acquires the hand area image from the hand area detector 22, performs binarization processing to the acquired hand area image, and generates a binary image in which a skin area is distinguished from other areas in the hand area image. The binary image generator 23 outputs the generated binary image to the fingertip candidate detector 24, the finger detector 25, and the palm detector 26.

The binary image generator 23 can generates the binary image from the hand area image using any well-known technology. For example, the binary image generator 23 may set the area obtained by a background difference to the skin area. The binary image generator 23 may extract the skin area using a previously-defined skin color model. The binary image generator 23 may extract the skin area with a color at a predetermined position (for example, neighborhood of center) of the hand area image as the skin color model. Using edge detection (such as Sobel and Canny), the binary image generator 23 may specify a closed contour by a contour extraction technique such as Snake, and extract the area formed by the closed contour as the skin area. The binary image generator 23 may specify the skin area using the depth information.

The fingertip candidate detector 24 acquires the binary image from the binary image generator 23, and detects one or plural fingertip candidates from the binary image. As used herein, the fingertip candidate means the skin area considered to be a fingertip in the binary image.

Specifically, the fingertip candidate detector 24 scans a rectangular area having a predetermined size on the binary image, and specifies the skin area as the fingertip candidate in the case that a ratio of the skin area included in the rectangular area falls within a predetermined range and in the case that a center of gravity of the skin area included in the rectangular area is located in a lower half of the rectangular area. For example, in the case that the ratio of the skin area to the rectangular area ranges from 60% to 80%, and that the position where the skin area is received is located in the lower half of the rectangular area, the fingertip candidate detector 24 specifies the skin area concerned as the fingertip candidate.

Here, it is assumed that the user performs the hand gesture to the camera such that the fingertip is oriented upward as illustrated in FIGS. 2A-2F. Therefore, whether the skin area is the fingertip candidate is determined using a condition that the center of gravity of the skin area is located in the lower half of the rectangular area.

Figure 3:
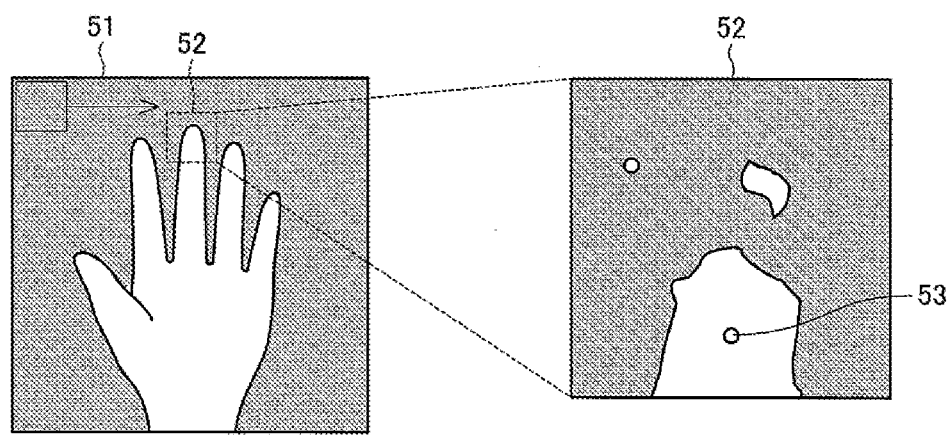
FIG. 3 is a view illustrating an example of a fingertip candidate detected from a binary image.

In an example of FIG. 3, the fingertip candidate detector 24 scans the rectangular area having the predetermined size on a binary image 51, and specifies the skin area included in a rectangular area 52 satisfying the condition as the fingertip candidate. The fingertip candidate detector 24 also specifies a center of gravity 53 of the fingertip candidate.

An upper limit may be set to the number of fingertip candidates detected by the fingertip candidate detector 24. For example, the fingertip candidate detector 24 may detect the fingertip candidate up to ten pieces.

The fingertip candidate detector 24 outputs the center of gravity of the detected fingertip candidate to the finger detector 25. In the case that the fingertip candidate cannot be detected from the binary image, the fingertip candidate detector 24 notifies the palm detector 26 that the fingertip candidate cannot be detected.

The finger detector 25 acquires the center of gravity of the fingertip candidate from the fingertip candidate detector 24, and detects the skin area that extends continuously by a predetermined length in a certain direction from the acquired center of gravity of the fingertip candidate as the finger.

Figure 4:
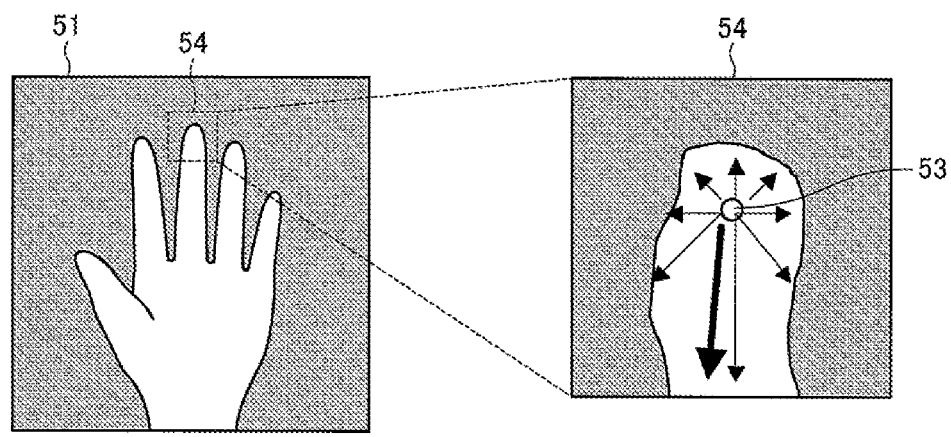
FIG. 4 is a view illustrating an extending direction of a skin area from a center of gravity of the fingertip candidate.

Specifically, the finger detector 25 specifies an extending direction in which the skin area extends maximally from the center of gravity of the fingertip candidate. In one or more embodiments of the present invention, as illustrated in FIG. 4, the finger detector 25 searches eight directions, namely, vertical, horizontal, and diagonal directions from the center of gravity of the fingertip candidate. In an example of FIG. 4, because the skin area extends maximally in the downward direction, the finger detector 25 sets the extending direction as the "downward direction".

Figure 5:
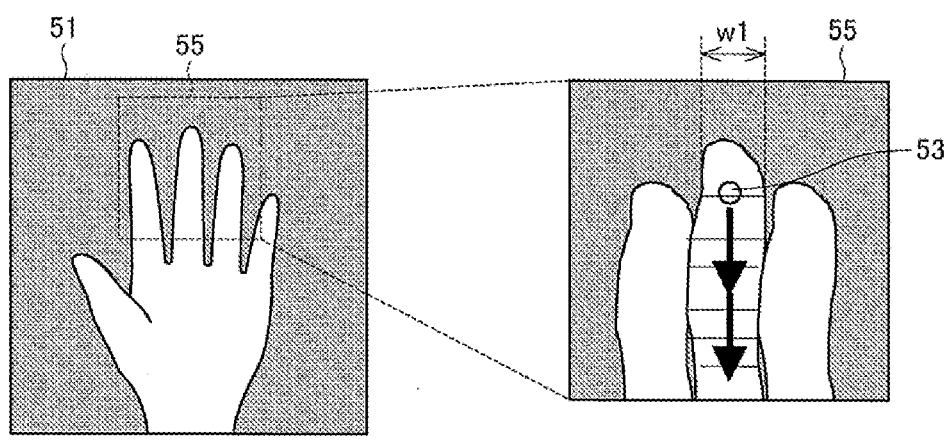
FIG. 5 is a view illustrating a method for detecting a finger from the binary image based on the fingertip candidate.

Then, as illustrated in FIG. 5, the finger detector 25 determines whether the skin area extends at constant intervals toward the extending direction from the center of gravity 53. The finger detector 25 specifies the skin area as the finger candidate when the skin area extends by the predetermined length toward the extending direction from the center of gravity.

More specifically, the finger detector 25 specifies a reference width w1 of the skin area in the direction orthogonal to the specified extending direction in the center of gravity of the fingertip candidate. When a difference value between a width of the skin area in the direction orthogonal to the extending direction and the reference width w1 at the position that separates from the center of gravity by the predetermined length in the extending direction is less than or equal to a predetermined value (for example, 15% of reference width w1), the finger detector 25 determines that the skin area extends by the predetermined length in the extending direction. Then the finger detector 25 makes the determination with respect to the position that separates by the predetermined length in the extending direction from the position where the skin area is determined to extend. The finger detector 25 makes the determination until the difference value between the width of the skin area and the reference width w1 is greater than the predetermined value, or until the skin area is out of the area of the binary image. The finger detector 25 specifies the position where the skin area is determined to extend, the position being located at an end in the extending direction from the center of gravity 53. When a length from the center of gravity of the fingertip candidate to the specified finger end position falls within a predetermined range, the finger detector 25 specifies the skin area that extends from the fingertip candidate to the finger end position in the extending direction as the finger candidate.

At this point, the finger detector 25 can determine that the skin area specified as the finger candidate as the "finger". In one or more embodiments of the present invention, whether a palm area exists in the extending direction of the specified finger candidate is further determined. When the palm area exists in the extending direction of the specified finger candidate, the finger detector 25 determined the skin area of the finger candidate to be the "finger".

In the case that any "finger" is not detected yet, the finger detector 25 outputs the finger end position and extending direction of the specified finger candidate to the palm detector 26. The finger detector 25 acquires a palm area detection result from the palm detector 26, and determines whether the palm area exists in the extending direction of the specified finger candidate. On the other hand, in the case that at least one "finger" is already detected, the finger detector 25 determines whether the palm area exists in the extending direction of the specified finger candidate based on the palm area detection result already acquired from the palm detector 26.

Figure 6:
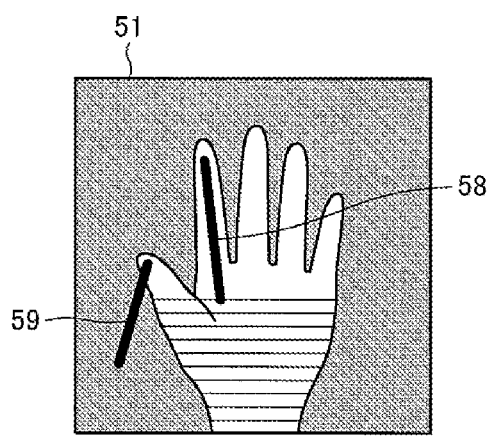
FIG. 6 is a view illustrating a positional relationship between a finger candidate and a palm.

For example, as illustrated in FIG. 6, it is assumed that the finger detector 25 detects the finger candidate indicated by a line segment 58 and the finger candidate indicated by a line segment 59 as the fingers from the second finger. In this case, the finger detector 25 determines that the finger candidate indicated by the line segment 58 is the finger because the palm area exists in the extending direction. On the other hand, the finger detector 25 determines that the finger candidate indicated by the line segment 59 is not the finger because the palm area does not exist in the extending direction.

The finger detector 25 may enhance accuracy of the finger detection by further performing edge detection or referring to the depth information.

The finger detector 25 notifies the shape specifying unit 27 of the number of detected fingers. The finger detector 25 may further notify the shape specifying unit 27 of at least one of the center of gravity of the fingertip, the extending direction, and the finger end position of the detected finger.

The finger detector 25 notifies the finger position specifying unit 28 of the center of gravity of the fingertip of at least one of the detected fingers.

The palm detector 26 acquires the binary image from the binary image generator 23, and detects the palm area from the acquired binary image.

Figure 7:
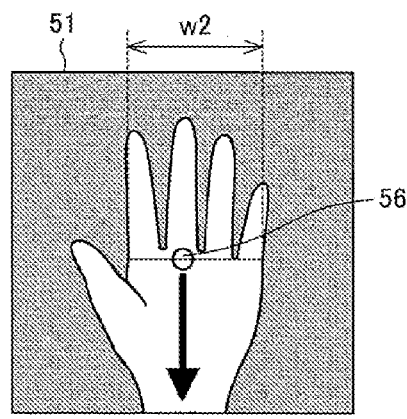
FIG. 7 is a view illustrating a method for detecting the palm from the binary image based on the finger candidate.
Figure 8:
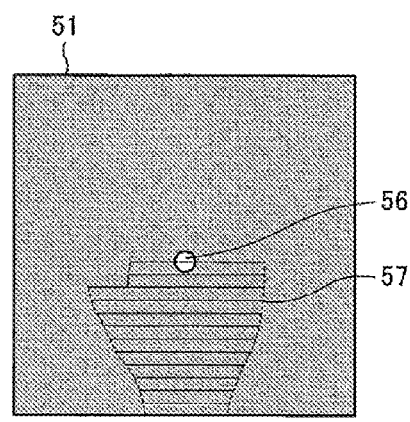
FIG. 8 is a view illustrating a detected palm area.

Specifically, as illustrated in FIG. 7, the palm detector 26 acquires a finger end position 56 and the extending direction of the finger candidate from the finger detector 25, and specifies a reference width w2 of the skin area in the direction orthogonal to the extending direction in the finger end position 56. The palm detector 26 determines whether a difference value between the width of the skin area in the direction orthogonal to the extending direction and the reference width w2 at the position that separates from the finger end position by the predetermined length in the extending direction is less than or equal to a predetermined value (for example, 30% of reference width w2). When determining that the difference value between the width of the skin area and the reference width w2 is less than or equal to the predetermined value, the palm detector 26 performs the same determination with respect to the position that separates from the position by the predetermined length. The palm detector 26 makes the determination until the difference value between the width of the skin area and the reference width w2 is greater than the predetermined value, or until the skin area is out of the area of the binary image. The palm detector 26 specifies the palm end position where the difference value between the width of the skin area and the reference width w2 is determined to be less than or equal to the predetermined value, the palm end position being located at the end in the extending direction. The palm detector 26 specifies the skin area that extends continuously to the specified palm end position from the finger end position as the palm area. In an example of FIG. 8, the palm detector 26 specifies a skin area 57 as the palm area.

The palm detector 26 may enhance the accuracy of the palm area detection by determining whether the skin area from the finger end position to the palm end position falls within a predetermined range based on initial information, edge information, and the depth information, which will be described below.

The palm detector 26 detects the palm area from the binary image when being notified by the fingertip candidate detector 24 that the fingertip candidate cannot be detected. At this point, the palm detector 26 previously sets the initial information indicating a size of the user's palm. The palm detector 26 detects the palm area from the binary image based on the initial information. For example, the palm detector 26 may issue an instruction to the user to perform a predetermined hand gesture at a beginning of the gesture operation, set the initial information by acquiring the size of the user's palm from the image captured at that time. The initial information may include information indicating the position of the user's hand or the background image.

The palm detector 26 may detect the palm using any well-known technology.

The palm detector 26 notifies the finger detector 25 and the shape specifying unit 27 of the palm area detection result. The palm detector 26 notifies the finger detector 25 of the existence or nonexistence of the palm area as the detection result. The palm detector 26 notifies the finger detector 25 of the position of the detected palm area in the case that the palm area is detected. The palm detector 26 notifies the shape specifying unit 27 of at least the existence or nonexistence of the palm area. The palm detector 26 may also notify the shape specifying unit 27 of the position of the palm area.

The shape specifying unit 27 specifies the type of the hand gesture based on the number of fingers detected by the finger detector 25. Specifically, the shape specifying unit 27 specifies one of the gestures of the "zero-finger shape", the "one-finger shape", the "two-finger shape", the "three-finger shape", the "four-finger shape", and the "five-finger shape" based on the number of fingers detected by the finger detector 25.

Figure 9:
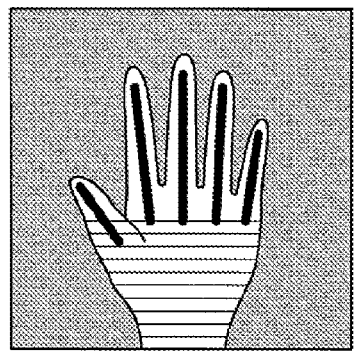
FIG. 9 is a view illustrating results of finger detection and palm detection.

For example, as illustrated in FIG. 9, in the case that the finger detector 25 detects the five fingers, the shape specifying unit 27 determines that the type of the hand gesture is the gesture of the "five-finger shape".

At this point, in the case that the finger detector 25 detects no finger, namely, in the case that the finger detector 25 cannot detect the finger, it is conceivable that the user currently performs the gesture of the "zero-finger shape", or that the user does not currently perform the effective gesture. Therefore, the shape specifying unit 27 acquires the palm area detection result from the palm detector 26, and the shape specifying unit 27 may determine that the type of the hand gesture is the gesture of the "zero-finger shape" in the case that the number of fingers detected by the finger detector 25 is zero and in the case that the palm detector 26 detects the palm area. In this case, the shape specifying unit 27 determines that there is no type of the hand gesture in the case that the number of fingers detected by the finger detector 25 is zero and in the case that the palm detector 26 does not detect the palm area.

The shape specifying unit 27 may determine the type of gesture based on a statistical discrimination technique (SVM or neural network) using the position and length (from the fingertip (for example, center of gravity) to the finger end position) of the finger detected by the finger detector 25, the position and size (area) of the palm area detected by the palm detector 26, the edge information, and the depth information.

The finger position specifying unit 28 specifies the center of gravity of the fingertip of one of the fingers detected by the finger detector 25 as an indication position. The finger position specifying unit 28 may specify the center of gravity of the fingertip of the predetermined finger (for example, index finger) as the indication position using the type of the gesture specified by the shape specifying unit 27, the position and length of the finger detected by the finger detector 25, the position and size (area) of the palm area detected by the palm detector 26, the edge information, and the depth information.

The control signal output unit 29 generates a control signal indicating at least one of the type of the gesture specified by the shape specifying unit 27 and the indication position specified by the finger position specifying unit 28, and outputs the generated control signal to the apparatus controller 3 through the communication unit 14.

The storage unit 12 stores the program and data, which are referred to by the controller 11, therein. For example, the initial information is stored in the storage unit 12.

(Gesture Recognition Processing Performed by Gesture Recognition Device)

Figure 10:
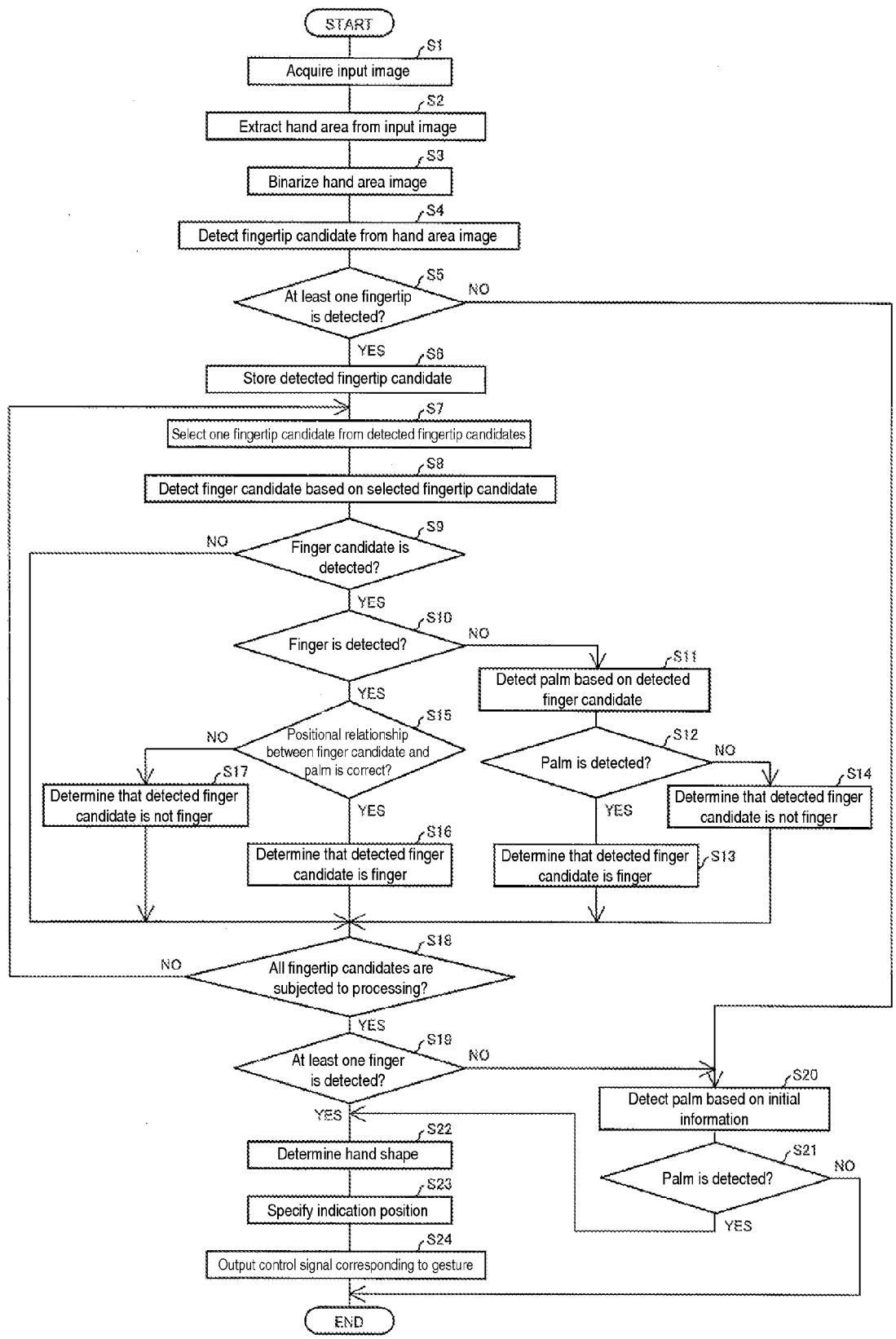
FIG. 10 is a flowchart illustrating an example of gesture recognition processing performed by the gesture recognition device.

Gesture recognition processing performed by gesture recognition device 1 will be described below with reference to FIG. 10. FIG. 10 is a flowchart illustrating the flow of the gesture recognition processing performed by the gesture recognition device 1.

As illustrated in FIG. 5, the image acquisition unit 21 acquires the input image captured by the user through the image input unit 13 (S1). The hand area detector 22 detects the user's hand from the input image, and extracts the hand area including the detected hand from the input image (S2). The binary image generator 23 performs the binarization processing to the hand area image to generate the binary image (S3).

The fingertip candidate detector 24 detects one or plural fingertip candidates from the binary image (S4). At this point, in the case that the fingertip candidate detector 24 detects at least one fingertip candidate (YES in S5), the fingertip candidate detector 24 stores the detected fingertip candidate (S6).

The finger detector 25 selects one of the fingertip candidate detected by the fingertip candidate detector 24 (S7). The finger detector 25 detects the finger candidate based on whether the skin area that extends by the predetermined length in a certain direction from the center of gravity of the selected fingertip candidate exists (S8). In the case that the finger candidate cannot be detected based on the fingertip candidate detected by the finger detector 25 (NO in S9), the flow goes to S18. On the other hand, in the case that the finger candidate is detected based on the fingertip candidate detected by the finger detector 25 (YES in S9), whether the "finger" is already detected is determined (S10).

In the case that the finger detector 25 does not detect any finger yet (NO in S10), the palm detector 26 detects the palm area based on the finger candidate detected by the finger detector 25 (S11). In the case that the palm detector 26 detects the palm area (YES in S12), the finger detector 25 determines that the detected finger candidate is the finger (S13). On the other hand, in the case that the palm detector 26 does not detect the palm area (NO in S12), the finger detector 25 determines that the detected finger candidate is not the finger (S14).

In the case that the finger detector 25 already detects at least one finger (YES in S10), the finger detector 25 determines whether the palm area detected by the palm detector 26 exists in the extending direction of the detected finger candidate (S15). In the case that the palm area exists in the extending direction of the detected finger candidate (YES in S15), the finger detector 25 determines that the detected finger candidate is the finger (S16). On the other hand, in the case that the palm area does not exist in the extending direction of the detected finger candidate (NO in S15), the finger detector 25 determines that the detected finger candidate is not the finger (S17).

The finger detector 25 determines whether all the fingertip candidates detected by the fingertip candidate detector 24 are subjected to the processing (S18). In the case that all the fingertip candidates are not subjected to the processing (NO in S18), the finger detector 25 returns to S7 to select another fingertip candidate detected by the fingertip candidate detector 24. On the other hand, in the case that all the fingertip candidates are subjected to the processing by the finger detector 25 (YES in S18), whether the finger detector 25 detects at least one finger is determined (S19).

In the case that the finger detector 25 cannot detect any finger (NO in S19), and in the case that fingertip candidate detector 24 cannot detect any fingertip candidate (NO in S5), the palm detector 26 detects the palm from the binary image based on the initial information (S20). In the case that the palm detector 26 cannot detect the palm (NO in S21), the gesture recognition processing is ended. On the other hand, in the case that the palm detector 26 detects the palm (YES in S21), the palm detector 26 notifies the shape specifying unit 27 of the detection result.

In the case that the finger detector 25 detects at least one finger (YES in S19), the finger detector 25 notifies the shape specifying unit 27 and the finger position specifying unit 28 of the detection result.

The shape specifying unit 27 specifies the type of the hand gesture based on the detection results of the finger detector 25 and palm detector 26 (S22). The finger position specifying unit 28 specifies the indication position based on the detection result of the finger detector 25 (S23). The control signal output unit 29 generates the control signal corresponding to the gesture, and outputs the generated control signal to the apparatus controller 3 (S24).

(Implementation Example by Software)

The control block (particular, controller 11) of the gesture recognition device 1 may be constructed with a logic circuit (hardware) formed in an integrated circuit (IC chip) or software using the CPU.

In the latter, the gesture recognition device 1 includes the CPU that issues a command of the program that is of the software implementing various functions, the ROM or a storage device (hereinafter referred to as a "recording medium") in which the program and various pieces of data are recorded while being readable with a computer (or CPU), and the RAM in which the program is expanded. The computer (or CPU) reads the program from the recording medium to execute the program. "Non-temporary material mediums" such as a tape, a disk, a card, a semiconductor memory, and a programmable logic circuit can be used as the recording medium. The program may be supplied to the computer through any transmission carrier (such as a communication network and broadcasting wave) through which the program can be transmitted. One or more embodiments of the present invention can also be implemented in the form of a data signal embedded in a carrier wave in which the program is materialized by electronic transmission.

(Summary)

A gesture recognition device in accordance with one or more embodiments of the present invention is configured to recognize a gesture of a hand from a captured image of a user, and includes: a fingertip candidate detector configured to detect a fingertip candidate from the image; a finger detector configured to detect a skin area as a finger, the skin area extending by a predetermined length in a certain direction from the fingertip candidate detected by the fingertip candidate detector; and a gesture type specifying unit configured to specify a type of the gesture based on the number of fingers detected by the finger detector.

According to the configuration, the fingertip candidate detector detects the fingertip candidate considered to be the fingertip from the captured image of the user, and the finger detector detects the skin area extending by the predetermined length in the certain direction from the fingertip candidate as the finger. That is, the gesture recognition device can detect the finger from the image through the simple processing.

The gesture type specifying unit specifies the type of the gesture based on the number of detected fingers. At this point, the gesture recognition device according to one or more embodiments of the present invention recognizes the hand gesture, and the gesture is classified by the number of raised fingers. Therefore, the gesture recognition device can accurately discriminate the type of the gesture based on the number of fingers.

Accordingly, advantageously various gestures can accurately be recognized through the simple processing.

A gesture recognition device in accordance with one or more embodiments of the present invention is configured to recognize a gesture of a hand from a captured image of a user, and includes: a fingertip candidate detector configured to detect a fingertip candidate from the image; a finger detector configured to detect a skin area as a finger, the skin area extending by a predetermined length in a certain direction from the fingertip candidate detected by the fingertip candidate detector; and a finger position specifying unit configured to specify a fingertip position of the finger detected by the finger detector as a position indicated by the user.

According to the configuration, the fingertip candidate detector detects the fingertip candidate considered to be the fingertip from the captured image of the user, and the finger detector detects the skin area extending by the predetermined length in the certain direction from the fingertip candidate as the finger. That is, the gesture recognition device can detect the finger from the image through the simple processing.

At this point, in the case that the user indicates the position by the hand, it is considered that the position is indicated by one of the fingertips. Therefore, the finger position specifying unit specifies the fingertip position as the indication position of the user, which allows the gesture recognition device to recognize the indication position of the user by the gesture.

Accordingly, advantageously various gestures can accurately be recognized through the simple processing.

In accordance with one or more embodiments of the present invention, in a gesture recognition device, the finger detector may set the certain direction to a direction in which the skin area extends maximally from a center of gravity of the fingertip candidate detected by the fingertip candidate detector.

At this point, the direction in which the skin area extends maximally from the center of gravity of the fingertip is the extending direction of the finger. Therefore, according to the configuration, the finger detector can correctly specify the extending direction of the finger.

In accordance with one or more embodiments of the present invention, in a gesture recognition device, the finger detector may specify a reference width w1 of the skin area in the direction orthogonal to the certain direction in the center of gravity of the fingertip candidate detected by the fingertip candidate detector, and determine that the skin area extends in the certain direction when a difference value between a width of the skin area in the orthogonal direction and the reference width w1 is less than or equal to a predetermined value.

At this point, the finger is the skin area extending by the predetermined length in the certain direction, and is the skin area having the substantially same width as the fingertip. Therefore, according to the configuration, whether the skin area extending from the fingertip candidate is the finger can correctly be determined.

In accordance with one or more embodiments of the present invention, in a gesture recognition device, the fingertip candidate detector may scan a rectangular area having a predetermined size on the image, and specify the skin area as the fingertip candidate when a ratio of the skin area included in the rectangular area falls within a predetermined range and when a center of gravity of the skin area is located in a lower half of the rectangular area.

In a gesture recognition device according to one or more embodiments of the present invention, it is assumed that the user performs the gesture such that the fingertip is oriented toward the upward direction of the camera (image). Therefore, in the case that the area including the fingertip on the image is extracted, it is considered that the fingertip is located in a lower portion of the extracted area. Therefore, according to the configuration, the fingertip candidate having a high probability of the fingertip can be detected.

In accordance with one or more embodiments of the present invention, a gesture recognition device further includes a palm detector configured to detect a palm from the image. In the gesture recognition device, the finger detector may specify the skin area extending by a predetermined length in a certain direction from the fingertip candidate as a finger candidate, and detect the finger candidate as the finger when the palm detected by the palm detector is located in the certain direction from the finger candidate.

According to the configuration, in the case that the palm is located in the extending direction of the finger candidate, the finger detector detects the finger candidate as the finger. Therefore, the finger detector can more accurately detect the finger.

In accordance with one or more embodiments of the present invention, a gesture recognition device further includes a palm detector configured to detect a palm from the image. In the gesture recognition device, the finger detector may specify the skin area extending by a predetermined length in a certain direction from the fingertip candidate as a finger candidate, detect the finger candidate as the finger when the palm detected by the palm detector is located in the certain direction from the finger candidate, and may detect fingers from a second finger using the reference width w1 of a first finger when at least one finger is already detected.

As described above, in the case that the palm is located in the extending direction of the finger candidate, there is a high probability that the finger candidate is the finger. The five fingers had the substantially same thickness. Therefore, the accuracy of the detection of the fingers from the second fingers can be improved by referring to the width of the finger having a high degree of certainty.

In accordance with one or more embodiments of the present invention, in a gesture recognition device, the palm detector may specify a reference width w2 of the skin area in a direction orthogonal to the certain direction of the finger candidate at an end position of the finger candidate detected by the finger detector, and detect skin area extending continuously in the certain direction from the end position as the palm when a difference value between a width of the skin area in the orthogonal direction and the reference width w2 is less than or equal to a predetermined value.

At this point, the palm is the skin area that extends continuously in the extending direction of the finger, and is the skin area having the substantially same width as the width at the end position (a base of the finger) of the finger. Therefore, according to the configuration, whether the skin area extending from the end position of the finger candidate is the palm can accurately be determined.

One or more embodiments of the present invention also includes an electronic apparatus provided with the gesture recognition device.

A gesture recognition method in accordance with one or more embodiments of the present invention for recognizing a gesture of a hand from a captured image of a user includes the steps of: detecting a fingertip candidate from the image; detecting a skin area as a finger, the skin area extending by a predetermined length in a certain direction from the fingertip candidate detected in the fingertip candidate detecting step; and specifying a type of the gesture based on the number of fingers detected in the finger detecting step.

A gesture recognition method in accordance with one or more embodiments of the present invention for recognizing a gesture of a hand from a captured image of a user, includes the steps of: detecting a fingertip candidate from the image; detecting a skin area as a finger, the skin area extending by a predetermined length in a certain direction from the fingertip candidate detected in the fingertip candidate detecting step; and specifying a fingertip position of the finger detected in the finger detecting step as a position indicated by the user.

The gesture recognition device of one or more embodiments of the present invention may be constructed with a computer. In this case, one or more embodiments of the present invention also includes a control program causing the computer to act as each unit of the gesture recognition device and a computer-readable recording medium in which the control program is recorded.

The present invention is not limited to the above embodiments, but various changes can be made within the scope of the claims. That is, an embodiment obtained by a combination of technical means changed properly in the scope of the claims is also included in the technical scope of the present invention.

One or more embodiments of the present invention can be applied to the electronic apparatus that can be operated by the gesture.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gesture recognition device configured to recognize a gesture of a hand from a captured image of a user, comprising:
    a fingertip candidate detector that detects a fingertip candidate from the image;
    a finger detector that detects a skin area as a finger, the skin area extending by a predetermined length in a certain direction from the fingertip candidate detected by the fingertip candidate detector; and
    a gesture type specifying unit that specifies a type of the gesture based on the number of fingers detected by the finger detector,
    wherein the finger detector specifies a first reference width of the skin area in the direction orthogonal to the certain direction in the center of gravity of the fingertip candidate detected by the fingertip candidate detector, and
    wherein the finger detector determines that the skin area extends in the certain direction when a difference value between a width of the skin area in the orthogonal direction and the first reference width is less than or equal to a predetermined value.

2. The gesture recognition device according to claim 1, wherein the finger detector sets the certain direction to a direction in which the skin area extends maximally from a center of gravity of the fingertip candidate detected by the fingertip candidate detector.

3. The gesture recognition device according to claim 2, wherein the finger detector specifies a reference width w1 of the skin area in the direction orthogonal to the certain direction in the center of gravity of the fingertip candidate detected by the fingertip candidate detector, and
    wherein the finger detector determines that the skin area extends in the certain direction when a difference value between a width of the skin area in the orthogonal direction and the reference width w1 is less than or equal to a predetermined value.

4. The gesture recognition device according to claim 2, wherein the fingertip candidate detector scans a rectangular area having a predetermined size on the image, and
    wherein the fingertip candidate detector specifies the skin area as the fingertip candidate when a ratio of the skin area included in the rectangular area falls within a predetermined range and when a center of gravity of the skin area is located in a lower half of the rectangular area.

5. The gesture recognition device according to claim 2, further comprising:
    a palm detector that detects a palm from the image,
    wherein the finger detector specifies the skin area extending by a predetermined length in a certain direction from the fingertip candidate as a finger candidate, and
    wherein the finger detector detects the finger candidate as the finger when the palm detected by the palm detector is located in the certain direction from the finger candidate.

6. The gesture recognition device according to claim 1, further comprising:
    a palm detector configured to detect a palm from the image,
    wherein the finger detector specifies the skin area extending by a predetermined length in a certain direction from the fingertip candidate as a finger candidate,
    wherein the finger detector detects the finger candidate as the finger when the palm detected by the palm detector is located in the certain direction from the finger candidate, and
    wherein the finger detector detects fingers from a second finger using the first reference width of a first finger when at least one finger is already detected.

7. An electronic apparatus comprising:
    the gesture recognition device according to claim 1.

8. The gesture recognition device according to claim 1,
    wherein the fingertip candidate detector scans a rectangular area having a predetermined size on the image, and
    wherein the fingertip candidate detector specifies the skin area as the fingertip candidate when a ratio of the skin area included in the rectangular area falls within a predetermined range and when a center of gravity of the skin area is located in a lower half of the rectangular area.

9. The gesture recognition device according to claim 1, further comprising:
    a palm detector that detects a palm from the image,
    wherein the finger detector specifies the skin area extending by a predetermined length in a certain direction from the fingertip candidate as a finger candidate, and
    wherein the finger detector detects the finger candidate as the finger when the palm detected by the palm detector is located in the certain direction from the finger candidate.

10. The gesture recognition device according to claim 1, wherein the finger detector defines the skin area as the finger based on having the predetermined length in the certain direction from the fingertip candidate.

11. A gesture recognition device configured to recognize a gesture of a hand from a captured image of a user, comprising:
    a fingertip candidate detector that detects a fingertip candidate from the image;
    a finger detector that detects a skin area as a finger, the skin area extending by a predetermined length in a certain direction from the fingertip candidate detected by the fingertip candidate detector; and
    a gesture type specifying unit that specifies a type of the gesture based on the number of fingers detected by the finger detector, wherein the fingertip candidate detector scans a rectangular area having a predetermined size on the image, and wherein the fingertip candidate detector specifies the skin area as the fingertip candidate when a ratio of the skin area included in the rectangular area falls within a predetermined range and when a center of gravity of the skin area is located in a lower half of the rectangular area.

12. A gesture recognition device configured to recognize a gesture of a hand from a captured image of a user, comprising:
    a fingertip candidate detector that detects a fingertip candidate from the image;
    a finger detector that detects a skin area as a finger, the skin area extending by a predetermined length in a certain direction from the fingertip candidate detected by the fingertip candidate detector; and
    a gesture type specifying unit that specifies a type of the gesture based on the number of fingers detected by the finger detector,
    a palm detector that detects a palm from the image,
    wherein the finger detector specifies the skin area extending by a predetermined length in a certain direction from the fingertip candidate as a finger candidate, and
    wherein the finger detector detects the finger candidate as the finger when the palm detected by the palm detector is located in the certain direction from the finger candidate.

13. The gesture recognition device according to claim 12,
    wherein the palm detector specifies a second reference width of the skin area in a direction orthogonal to the certain direction of the finger candidate at an end position of the finger candidate detected by the finger detector, and
    wherein the palm detector detects skin area extending continuously in the certain direction from the end position as the palm when a difference value between a width of the skin area in the orthogonal direction and the second reference width is less than or equal to a predetermined value.

14. A gesture recognition device configured to recognize a gesture of a hand from a captured image of a user, comprising:
    a fingertip candidate detector that detects a fingertip candidate from the image;
    a finger detector that detects a skin area as a finger, the skin area extending by a predetermined length in a certain direction from the fingertip candidate detected by the fingertip candidate detector; and
    a finger position specifying unit that specifies a fingertip position of the finger detected by the finger detector as a position indicated by the user,
    wherein the finger detector sets the certain direction to a direction in which the skin area extends maximally from a center of gravity of the fingertip candidate detected by the fingertip candidate detector.

15. The gesture recognition device according to claim 14,
    wherein the finger detector specifies a reference width w1 of the skin area in the direction orthogonal to the certain direction in the center of gravity of the fingertip candidate detected by the fingertip candidate detector, and
    wherein the finger detector determines that the skin area extends in the certain direction when a difference value between a width of the skin area in the orthogonal direction and the reference width w1 is less than or equal to a predetermined value.

16. The gesture recognition device according to claim 14,
    wherein the fingertip candidate detector scans a rectangular area having a predetermined size on the image, and
    wherein the fingertip candidate detector specifies the skin area as the fingertip candidate when a ratio of the skin area included in the rectangular area falls within a predetermined range and when a center of gravity of the skin area is located in a lower half of the rectangular area.

17. The gesture recognition device according to claim 14, further comprising:
    a palm detector that detects a palm from the image,
    wherein the finger detector specifies the skin area extending by a predetermined length in a certain direction from the fingertip candidate as a finger candidate, and
    wherein the finger detector detects the finger candidate as the finger when the palm detected by the palm detector is located in the certain direction from the finger candidate.

18. The gesture recognition device according to claim 14, wherein the finger detector defines the skin area as the finger based on having the predetermined length in the certain direction from the fingertip candidate.

* * * * *